Aug. 15, 1939 M. WAGNER 2,169,670
AXLE ARRANGEMENT FOR MOTOR DRIVEN VEHICLES
Filed Dec. 31, 1935 2 Sheets-Sheet 1

Inventor
Max Wagner

Inventor
Max Wagner

Patented Aug. 15, 1939

2,169,670

UNITED STATES PATENT OFFICE 2,169,670

AXLE ARRANGEMENT FOR MOTOR-DRIVEN VEHICLES

Max Wagner, Stuttgart, Germany, assignor to Daimler-Benz Aktiengesellschaft, Stuttgart-Unterturkheim, Germany, a German company Application December 31, 1935, Serial No. 56,916
In Germany December 31, 1934

69 Claims. (Cl. 180—73)

My invention relates to a vehicle and, more particularly, to the chassis of a motor-driven vehicle.

The object of my invention is to provide a chassis in which the space between the axles is not obstructed by the struts of the axle and, hence, may be used for the accommodation of other elements such as the frame and the seats.

Further objects are to provide for easy accessibility of the pivotal connection between the frame and the strut or struts supporting the axle; to provide an axle suspension of simple and rugged structure permitting the driving engine to be arranged in close proximity to the axle; to provide an axle suspension in which the weight of the elements participating in the movement of the wheels relative to the frame is reduced to a minimum and in which the axle is laterally guided relatively to the frame.

These objects are accomplished by the provision of a chassis in which the strut or struts supporting the rigid axle of a pair of wheels, preferably the rear wheels, is or are pivotally connected to the frame at a point located at the end of the frame, that is to say, at a point outside of the space intermediate the two axles.

Further objects of my invention will appear from the description of two preferred embodiments of my invention and the features of novelty will be pointed out in the claims.

In the accompanying drawings, Figs. 1 to 3 show one embodiment and Figs. 4 to 6 another embodiment, wherein Fig. 1 is a side-view of the rear end of a motor-driven vehicle, one wheel being omitted to better expose the axle suspension to view;

Figure 1:
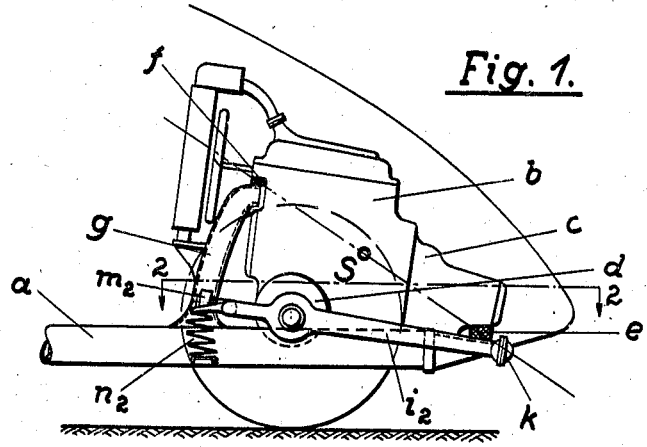
Figure 2:
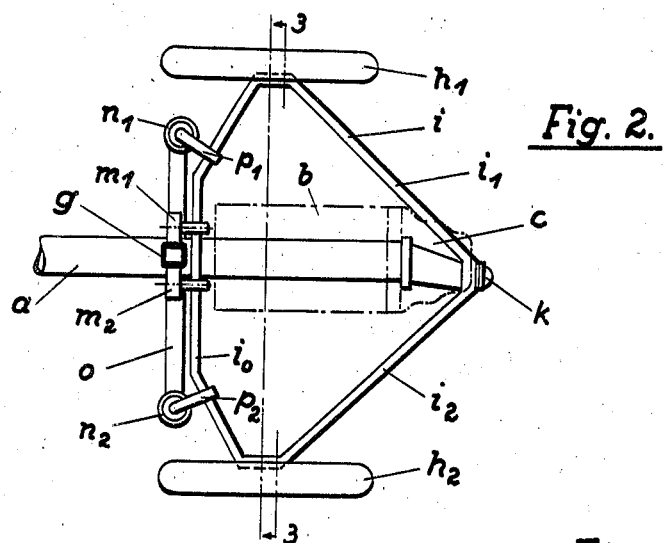
Fig. 2 is a plan-view of Fig. 1, partly in section along line 2—2 of Fig. 1, the engine, body and wheel driving shafts being omitted.
Figure 3:
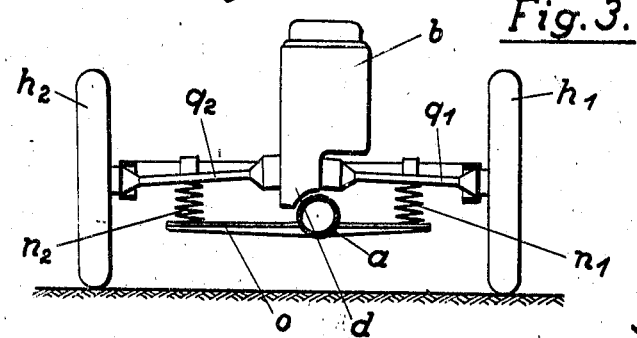
Fig. 3 is a rear-view partly in section along line 3—3 of Fig. 2.

Referring to Figs. 1 to 3, $a$ is a tubular beam of the frame of a motor-driven vehicle in which the engine $b$ is mounted in the rear end of the chassis and arranged to drive the rear wheel $h_1$ and $h_2$. The engine $b$ and the casings of the transmission gear $c$ and the differential gear $d$ constitute a unit, the rear end of which is supported on the end of the beam $a$, a cushion $e$ being interposed, while the front end of the unit bears on a bracket $g$ which is attached to and projects upwardly from the beam $a$, a cushion $f$ being interposed. The two supporting points are so disposed that a line connecting the same will intersect the center of gravity S of the driving unit, as diagrammatically indicated in Fig. 1.

The wheels $h_1$ and $h_2$ are mounted on a triangular frame $i$ comprising a tubular axle $i_0$ and two rearwardly converging struts $i_1$ and $i_2$ of U-shaped cross-section. This frame is pivotally connected to the rear end of the beam $a$ by a universal joint $k$. The lateral faces of the bracket $g$ serve to guide two wheels $m_1$ and $m_2$ of rubber which are mounted on parallel studs projecting forwardly from the axle $i_0$, whereby the central section of the axle is guided in a truly vertical direction relative to the chassis. It is evident that the wheels $m_1$ and $m_2$ will transmit all lateral forces exerted on the axle directly to the chassis.

The springs interposed between the axle and the chassis are helical springs $n_1$ and $n_2$ mounted for free lateral deflection, that is to say, free from lateral contact with any guiding means. The lower ends of the springs bear on the ends of a transverse beam $o$ attached to the tubular beam $a$, while the upper ends of the springs support forwardly projecting extensions $p_1$ and $p_2$ of the axle $i_0$. The wheels $h_1$ and $h_2$ are driven from the engine $b$ by shafts $q_1$ and $q_2$ through the intermediary of suitable universal joints.

It will be appreciated that the described arrangement affords many advantages if compared with prior chassis constructions in which the struts supporting the axle were pivotally connected to the frame at a point intermediate the front wheels and the rear wheels.

One advantage results from the fact that the axle suspending means do not obstruct the space intermediate the axles. Another advantage is the ready accessibility of the universal joint $k$ at the end of the frame. Moreover, the described suspension, when applied to the axle of the driven wheels, results in the struts $i_1$ and $i_2$ being subjected to tensional stresses only by the traction force and, therefore, may be made lighter than it would be possible otherwise. The driving unit including the transmission gear and the differential gear may be arranged within the triangular axle frame $i_0$, $i_1$, $i_2$, the engine being located close to the base $i_0$ of the triangle, whereby the tapered end of the unit enclosing the transmission gear will be accommodated within the rear corner confined by the struts $i_1$ and $i_2$. This arrangement affords the advantage that the weight of the motor unit overhanging the geometrical axis of the wheels is reduced to a minimum owing to the close proximity of the engine to this axis. If desired, the axle frame $i_0$, $i_1$, $i_2$ may be made of an integral beam or tube which is suitably bent.

The lateral guidance of the axle relative to the chassis by the wheels $m_1$ and $m_2$ will give the car improved riding qualities.

Figure 4:
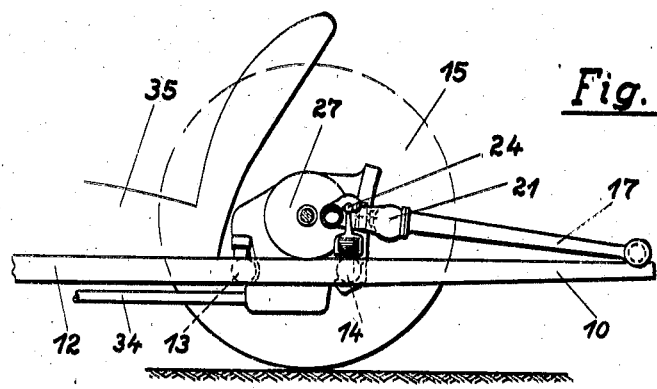
Fig. 4 is a view similar to that of Fig. 1, partly in section along line 4—4 of Fig. 5.
Figure 5:
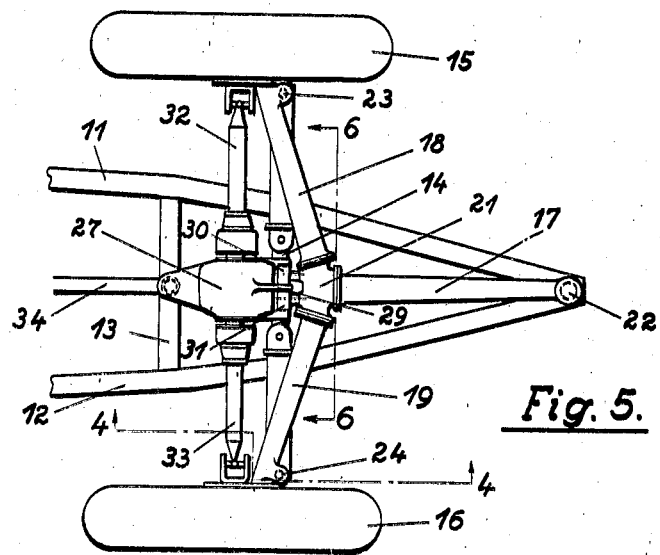
Fig. 5 is the plan-view of Fig. 4.
Figure 6:
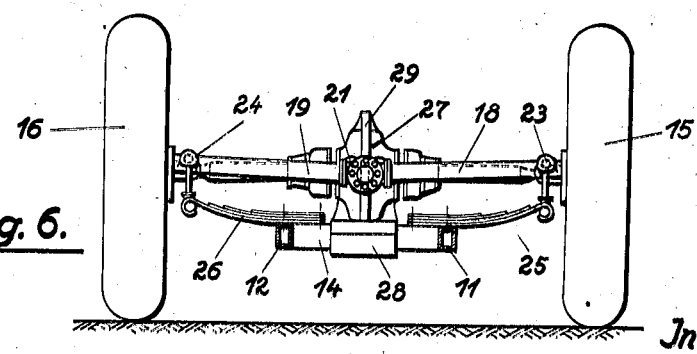
Fig. 6 is a rear-view of the embodiment shown in Figs. 4 and 5, partly in section along line 6—6 of Fig. 5.

In Figs. 4, 5 and 6 I have shown my invention applied to a motor-driven vehicle in which the motor is mounted in the front end of the chassis. In this modification the axle carrying the rear wheels is supported by a single strut pivotally connected to the rear end of the frame.

The frame 10 comprises two longitudinal beams 11 and 12 connected by two tubular transverse beams 13 and 14. The rear wheels 15 and 16 are carried by a rigid axle comprised of tubular members 18 and 19 and a connecting member 21. A strut 20 pivoted by a universal joint 22 to the rear end of the frame at the point of juncture of the beams 11 and 12 is rigidly connected to the member 21, whereby a star-shaped axle structure 18, 19 and 20 is formed.

The frame beams 11 and 12 extend below the tubular axle members 18 and 19, thus providing for a low disposition of the center of gravity of the vehicle. In this embodiment the springs interposed between the axle 18, 19 and the frame are leaf-springs 25, 26 of the cantilever type. which are suitably connected to the beams 11, 12 and 14 and project outwardly therefrom. Their free ends are disposed beneath the axle members 18 and 19 and are suitably connected therewith by spring shackles 23 and 24. A gear case 27 including the differential gear and, if desired, the transmission gear extends between and above the transverse beams 13 and 14 and is suitably attached thereto. The attachment of the gear case to the beam 14 may comprise a sleeve 28 suitably attached to the gear case 27 and surrounding the tubular transverse beam 14, an annular rubber member (not shown) being interposed between the members 28 and 14.

The gear case is formed with a vertical rear rib or fin 29 which is preferably arc-shaped with the universal joint 22 as its center as indicated in Fig. 4 and serves a similar function as the bracket $g$ in the first described embodiment. To this end, the axle member 21 is provided with two parallel forwardly projecting studs on which rubber wheels 30 and 31 are mounted to engage the rib 29 between them, whereby the axle is truly vertically guided relatively to the frame. Articulated shafts 32 and 33 connect the gearing in case 27 with the wheels 15 and 16. The longitudinal shaft 34 connecting the engine (not shown) with the gearing is arranged as low as possible, whereby the seats 35 may be arranged at a very low level.

The modification illustrated in Figs. 4, 5 and 6 lends itself particularly to the attainment of a low weight and is, therefore, of importance for vehicles in which the reduction of weight is a primary requirement. The provision of a single strut 20 permits the width of the body to be reduced whereby the shape of the body may be more truly stream-lined. As the axle structure 18, 19 does not include any power-transmitting elements, the weight of the members participating in the up and down movement of the wheels becomes very low. Owing to the pivotal connection of the strut 20 to the rear end of the frame at 22, the space intermediate the axles is fully available for the accommodation of the frame and the passenger seats. This advantage is enhanced by the disposition of the frame below the axle structure and by the low disposition of the driving shaft 34.

Owing to the pivotal connection of the strut 17 to the point of juncture of the two frame members 11 and 12, the forces to be transmitted by the strut to the frame will be taken up very efficiently.

My invention is capable of numerous modifications within the scope of the appended claims. The axle may be supported on the frame, for instance, intermediate the two axles while the drive is effected independently, for instance, from the end of the chassis or the driving unit may be mounted substantially between the wheels of the chassis on the frame. Moreover, the frame may be arranged below the axle or the arrangement of the driving unit may be provided independently of the particular type of support of the axle.

The invention is not intended to be limited to the two forms shown, which are to be understood as illustrative only and not as limiting, as various changes in construction and arrangement may be made, all coming within the scope of the claims which follow.

What I claim is:

1. In the chassis of a vehicle, the combination comprising a longitudinally extending tubular frame beam, a rigid axle, rear wheels mounted on said axle, rearwardly converging struts attached to said axle, and universal joint means interconnecting the extreme rear end of said tubular frame beam and the converging ends of said struts.

2. In the chassis of a motor-driven vehicle, the combination comprising a frame, a rigid axle carrying a pair of wheels, struts forming a triangular structure together with said axle, a joint between said structure and the rear end of said frame, an engine mounted on said frame within said triangular structure, and motion transmitting means connecting said engine to said wheels.

3. In the chassis of a motor-driven vehicle, the combination comprising a frame, a rigid axle, a pair of wheels mounted on said axle, rearwardly converging struts attached to said axle and forming a triangular structure therewith, a joint between the rear end of said frame and said triangular structure, a driving unit mounted on said frame and surrounded by said triangular structure, and motion transmitting means connecting said driving unit with said wheels.

4. In the chassis of a motor-driven vehicle, the combination comprising a frame, a rigid axle, a pair of wheels mounted on said axle, reawardly converging struts attached to said axle and forming a triangular structure therewith, a joint between the rear end of said frame and said triangular structure, a driving unit mounted on said frame and surrounded by said triangular structure, and articulated shafts connecting said driving unit with said wheels.

5. In the chassis of a motor-driven vehicle, the combination comprising a frame, a rigid axle, a pair of wheels mounted thereon, rearwardly converging struts attached to said axle and forming a triangular structure therewith, a joint between the rear end of said frame and said triangular structure, and a driving unit mounted on said frame and surrounded by said triangular structure and comprising an engine and a transmission gear, the engine being arranged adjacent to said axle and the transmission gear within the corner between said converging struts.

6. In the chassis of a motor-driven vehicle, the combination comprising a frame, a rigid axle, a pair of wheels mounted thereon, a pair of struts attached to the axle to form a triangular structure therewith, a joint between one end of the frame and said triangular structure at the point of intersection of said struts with one another, means for preventing lateral motion of said axle and struts relative to said frame about said joint, driving means positioned on the frame for driving the wheels, and means independent of the axle for the transmission of the drive from the driving means to the wheels.

7. In the chassis of a motor-driven vehicle, the combination comprising a frame, a rigid axle, a pair of wheels mounted thereon, struts converging toward the rear and attached to the axle to form a triangular structure therewith, a joint between one end of the frame and said triangular structure at the point of intersection of said struts with one another, means for preventing lateral motion of said axle and struts relative to said frame about said joint, drive means positioned on the frame for driving the wheels, and means independent of the axle for the transmission of the drive from the driving means to the wheels.

8. In the chassis of a vehicle, the combination comprising a frame including a tubular beam, a rigid wheel axle, wheels mounted thereon, converging struts attached to said axle to form a triangular structure therewith, a joint between the converging ends of said struts and the end of said beam, guiding means mounted on said axle for vertical guidance thereof relative to said frame, springs interposed between said frame and said axle, and means attached to said axle for engaging said springs, said axle being curved in a direction away from said joint beyond the geometrical axis of said wheels.

9. In the chassis of a vehicle, the combination comprising a frame including a tubular longitudinal beam, a wheel axle, struts attached to said wheel axle and linked to the end of said frame, a bracket rigidly attached to said tubular beam and projecting upwardly therefrom, and rubber wheels mounted on said axle and adapted to run on the side faces of said bracket, said axle being curved substantially within the plane of said struts in a direction away from the latter.

10. In the chassis of a vehicle, the combination comprising a frame including a tubular longitudinal beam, a wheel axle, struts attached to said wheel axle and linked to the end of said beam, a bracket rigidly attached to said tubular beam and projecting upwardly therefrom, rubber wheels mounted on said axle and adapted to run on the side faces of said bracket, a transverse beam attached to said tubular beam, and two helical springs interposed between said transverse beam and said axle and arranged for free lateral deflection, said axle being curved substantially within the plane of said struts in a direction away from the latter.

11. In the chassis of a vehicle, the combination comprising a frame including a longitudinal tubular beam, a bracket rigidly attached to said tubular beam and projecting upwardly therefrom, and a driving unit solely supported in two points, one located at the upper end of said bracket and the other one at the rear end of said tubular beam, the axis of said driving unit extending parallel to said tubular beam.

12. In the chassis of a vehicle, the combination comprising a tubular frame beam, a wheel axle, struts linked to the end of said beam and attached to said axle to form a triangular structure therewith, a bracket rigidly attached to said beam and extending upwardly therefrom, an engine supported on two points, one located at the upper end of said bracket and the other one at the rear end of said beam, and rubber rollers mounted on said axle and adapted to ride on side faces of said bracket.

13. In the chassis of a vehicle, the combination comprising a frame, a rigid axle, a pair of wheels mounted thereon, a single strut attached to said axle, a joint pivotally connecting said strut to said frame, an axle gear-casing mounted on said frame, axle shafts driving the wheels from the axle gear-casing, a substantially vertical guide on said casing, and rubber rollers mounted on said axle and riding on said guide.

14. In the chassis of a motor-driven vehicle, the combination comprising a frame including longitudinal beams and tubular transverse beams connecting the same, a rigid axle extending above said beams, rear wheels mounted on said axle, a strut attached to said axle, a joint pivotally connecting said strut to said frame, a gear-case containing driving gears supported by said transverse beams, resilient elements interposed between said gear-case and one of said transverse beams, and drive shafts connecting driving gears to said wheels.

15. In the chassis of a vehicle, the combination comprising a frame including two longitudinal beams converging towards the rear end, a rigid axle, rear wheels mounted on said axle, a strut attached to said axle, and a universal joint connecting said strut to the frame at the point of juncture of said converging beams.

16. In the chassis of a vehicle, the combination comprising a frame, a rigid axle, a pair of wheels mounted thereon, a single strut attached to said axle and pivoted to said frame, the axle being composed of a flanged connecting member and of two tubular axle-members, the axle-members and said strut radiating from said connecting member in different directions.

17. In the chassis of a vehicle, the combination comprising a flanged member, tubular elements attached thereto and radiating therefrom in different directions, wheels mounted on the ends of two of said tubular elements, a frame, a joint connecting the third tubular element to said frame, a guide on said frame, and rubber rollers mounted on said flanged member to ride on said guide, whereby the axle structure composed of said tubular elements is vertically guided relatively to said frame.

18. In the chassis of a motor-driven vehicle, the combination comprising a frame including two longitudinal beams and tubular transverse beams attached thereto, a rigid axle, a pair of wheels mounted thereon, a single strut attached to said axle, a joint pivotally connecting said strut to said frame, a resilient buffer surrounding one of said transverse beams, and a gear-case containing driving gears mounted on said buffer and drive shafts connecting said driving gears to said wheels.

19. In the chassis of a motor-driven vehicle, the combination comprising a frame, an axle, rear wheels mounted thereon, a strut attached to said axle, a joint pivotally connecting said strut to said frame, a gear-case containing driving gears attached to said frame independently of said axle, an engine shaft projecting forwardly from said gear-case at a plane disposed below said axle, and driving shafts connecting said driving gears to said wheels.

20. In the chassis of a motor-driven vehicle, the combination comprising a frame, an axle, rear wheels mounted thereon, a strut attached to said axle, a joint pivotally connecting said strut to said frame, a casing mounted on said frame independently of said axle and including a transmission gear and a differential gear, an engine shaft projecting forwardly from said casing within a plane disposed below said axle, and driving shafts connecting said driving gears to said wheels.

21. In the chassis of a motor driven vehicle, the combination comprising a frame, a rigid axle, wheels mounted on said axle, a strut structure connected to said axle and extending towards the end of said frame, a joint connecting said strut structure to the end of said frame in such a manner that the lines connecting the joint with both wheel centers form together with said axle a triangle capable of swinging relatively to the frame about the joint, a driving gear mounted on the frame independently of said axle and wholly within the axle triangle, and driving shafts for driving said wheels, connecting the driving gear with said wheels and extending outside of said axle.

22. In a chassis of a motor driven vehicle, the combination according to claim 21 in combination with guiding means mounted on said frame, further guiding means on said axle cooperating with sair first guiding means for vertical guidance of said axle, and springing means for springing said axle relatively to said frame.

23. In a vehicle, in combination, a frame having a rearwardly extending portion, a rigid axle having wheels mounted thereon and positioned above said frame, strut structure pivotally connecting said axle to the rearwardly extending portion of said frame, means for supporting the axle against lateral swinging relative to the frame, and spring means connecting said axle to said frame.

24. In a vehicle, a frame which terminates in an end lying substantially in the longitudinal central plane of the vehicle, a pair of wheels one on each side of said frame, an axle transverse to and crossing above the frame and upon which the said wheels are mounted, two struts, each connected with said axle and converging toward the end of the frame, so that they substantially form a triangle with the axle, means for universally connecting said struts at their intersection with the extreme end of the frame, and springing means interconnecting the axle and frame, by means of which the axle is sprung relative to the frame about the said universal connection.

25. In a vehicle, a frame which terminates in an end lying substantially in the longitudinal central plane of the vehicle, a pair of wheels one on each side of the frame, an axle transverse to and crossing the frame and upon which said wheels are mounted, two struts, each connected with said axle and converging toward the end of the frame, so that they substantially form a triangle with the axle, means for universally connecting said struts at their intersection with the extreme end of the frame, springing means interconnecting the axle and frame, by means of which the axle is sprung relative of the frame about said universal connection, and means positioned substantially in the longitudinal central plane of the vehicle for preventing lateral swinging of the axle about said universal connection.

26. In a vehicle, a frame which terminates in an end lying substantially in the longitudinal central plane of the vehicle, a pair of wheels one on each side of the frame, an axle transverse to and crossing the frame and upon which the said wheels are mounted, two struts, each connected with said axle and converging toward the end of the frame, so that they substantially form a triangle with the axle, means for universally connecting said struts at their intersection with the extreme end of the frame, springing means interconnecting the axle and frame, by means of which the axle is sprung relative of the frame about said universal connection, a substantially vertically extending guiding track positioned on the frame substantially in the longitudinal central plane of the vehicle, and cooperating guiding means on the axle engaging said guiding track in a substantially vertical direction for supporting said axle against lateral swinging.

27. In a vehicle, the combination according to claim 24, in combination with a guiding track positioned on the frame substantially in the longitudinal central plane of the vehicle, and cooperating guiding means on the axle, engaging said guiding track in a substantially vertical direction for supporting said axle against lateral swinging.

28. In a vehicle, a frame, a pair of wheels, one on each side of the frame, a stiff axle crossing the frame above the same, upon which the said wheels are mounted, at least one strut connected with said axle, universal joint means for connecting said strut to the frame substantially in the longitudinal central plane of the vehicle, an upwardly directed guiding track positioned substantially in the longitudinal central plane of the vehicle, guiding means on the axle for supporting the same against lateral swinging, said guiding means engaging said track and adapted for movement in a substantially vertical direction, and springing means for springing of the axle relative to the frame.

29. In a vehicle, the combination according to claim 28, in which said guiding means comprises two rollers journaled on said axle, which engage said guiding track on opposite sides thereof.

30. In a vehicle, the combination according to claim 28, in which the universal joint means is positioned lower than the wheel centers and the guiding means for the lateral supporting of the axle are positioned higher than the wheel centers.

31. In a power vehicle, a frame structure, a motor carried on the frame structure, a pair of wheels one on each side of the motor, a stiff axle system surrounding the motor in the form of a ring, on which the wheels are journaled, means for the supporting and springing of the axle system relative to the frame, and means for the driving of said wheels by said motor.

32. In a power vehicle, the combination according to claim 31, in combination with a joint connecting the axle system with the frame structure, arranged substantially in the longitudinal central plane of the vehicle and positioned beyond the wheel centers, whereby the axle system can swing with the wheels about the joint.

33. In a power vehicle, the combination according to claim 31, wherein the axle system surrounding the motor is positioned above the frame structure.

34. In a power vehicle, the combination according to claim 31, in which the means for the driving of said wheels by said motor comprises a driving gear and an axle drive, which form a unit with the motor and accordingly are surrounded by the axle system.

35. In the chassis of a motor driven vehicle, the combination comprising a frame, a rigid axle carrying a pair of wheels, struts forming a triangular structure together with said axle, a joint between said structure and one end of said frame, an engine mounted on said frame extending rearwardly beyond said axle and within said triangular structure, and motion transmitting means connecting said engine to said wheels.

36. In a power vehicle, a frame, a substantially vertically extending bracket on said frame, a motor attached to said bracket, a pair of wheels, an axle surrounding the motor and carrying said pair of wheels, a joint connecting the axle with the frame at that side of the motor opposite to the bracket, and means on said bracket forming a guiding track for guiding said axle in a substantially vertical direction.

37. In the chassis of a motor driven vehicle, the combination comprising a frame including a longitudinal tubular beam, a bracket rigidly attached to said tubular beam and projecting upwardly therefrom, a driving unit solely supported at two points, one located at the upper end of said bracket and the other at the rear end of said tubular beam, a pair of wheels, an axle supporting the wheels, struts connected with said axle, jointed means for connecting said struts with the rear end of said frame so that the axle can swing about the jointed connection, means on said bracket for guiding said axle in a substantially vertical direction, and means for the springing of said axle to said frame.

38. In a power vehicle, the combination according to claim 37, wherein the axle together with struts form a three cornered structural arrangement which surrounds the motor.

39. In a vehicle, the combination according to claim 28 in which the universal joint means is positioned lower than the wheel centers, and the guiding means for the lateral supporting of the axle are positioned above said universal joint means.

40. In the chassis of a motor driven vehicle, the combination comprising a frame, a rigid axle, wheels mounted on said axle, a strut structure connected to said axle and extending toward said frame, a joint connecting said strut structure to said frame in such a manner that the lines connecting the joint with both wheel centers form together with said axle a triangle capable of swinging relatively to the frame about the joint, a driving gear mounted on the frame independently of said axle, driving shafts for driving said wheels, connecting the driving gear with said wheels and extending outside of the said axle, guiding means mounted on said frame, further guiding means on said axle cooperating with said first guiding means for vertical guidance of said axle, and springing means for springing said axle relatively to said frame.

41. In a power vehicle, a frame, an axle, an engine, a substantially upwardly directed frame member, means for supporting said engine on said frame member, means for guiding said axle along said frame member in a substantially vertical direction, and spring means for springing said axle relative to said frame.

42. In the chassis of a motor-driven vehicle, the combination comprising a frame, a rigid axle, a pair of wheels mounted thereon, a pair of struts attached to the axle to form a triangular structure therewith, a joint between one end of the frame and said triangular structure at the point of intersection of said struts with one another, means for springing of the axle relative to the frame, means for the prevention of lateral movement of said axle relative to said frame about the said joint at the end of the frame, driving means positioned on the frame for driving the wheels, and means independent of the axle for the transmission of the drive from the driving means to the wheels.

43. In the chassis of a motor-driven vehicle, the combination comprising a frame, a rigid axle, a pair of wheels mounted thereon, struts converging toward the rear and attached to the axle to form a triangular structure therewith, a joint between one end of the frame and said triangular structure at the point of intersection of said struts with one another, means for springing the axle relative to the frame, means for the prevention of lateral movement of the axle relative to the frame about the said joint positioned at the end of the frame, driving means positioned on the frame for driving the wheels, and means independent of the axle for the transmission of the drive from the driving means to the wheels.

44. In the chassis of a vehicle, the combination comprising a frame including a longitudinal tubular beam, a bracket rigidly attached to said tubular beam and projecting upwardly therefrom, a driving unit solely supported at the upper end of said bracket and on said tubular beam, the axis of said driving unit extending within a substantially longitudinally vertical plane of the vehicle, an axle adapted to connect two wheels of the vehicle, which crosses the longitudinal frame member above the same, and means on the upwardly extending bracket for guiding of the axle.

45. In a vehicle, in combination, a frame having a rearwardly extending portion, a rigid axle having wheels mounted thereon and positioned above said frame, a strut structure connecting said axle to the rearwardly extending portion of said frame, springing means intermediate said axle and frame so arranged as to permit free lateral movement of said axle relative to said frame, and separate means for supporting said axle against lateral movement relative to said frame.

46. In a vehicle, a frame which terminates in an end lying substantially in the longitudinal central plane of the vehicle, a pair of wheels, one on each side of said frame, an axle transverse to and crossing the frame and upon which the wheels are mounted, a strut structure connected to said axle and extending towards the end of the frame, universal joint means for connecting said strut structure to the end of said frame in such a manner that the lines connecting the joint means with both wheel centers form together with said axle a triangle capable of swinging relative to said frame about the joint means, springing means interconnecting the axle and frame, by means of which the axle is sprung relative to the frame about the said joint means, and which are incapable of resisting lateral forces acting between the axle and the frame, and means for preventing lateral swinging of the axle about said joint means.

47. In a vehicle, the combination according to claim 46 in which the means for preventing lateral swinging of the axle comprises a substantially vertically extending guiding track positioned on the frame substantially in the longitudinal central plane of the vehicle, and cooperating guiding means on said axle engaging said guiding track in a substantially vertical direction for supporting said axle.

48. The combination according to claim 28 in which said guiding means comprises two rollers journalled on said axle, the axes of rotation of which extend substantially parallel in the longitudinal direction of the vehicle, and in a direction transverse of the vehicle bear from opposite sides upon two lateral guiding surfaces of the guiding track.

49. In a vehicle, a frame, a pair of wheels, one on each side of said frame, an axle transverse to and crossing the frame and upon which the said wheels are mounted, a strut structure connected to said axle and extending towards the end of the frame outside of the wheel base of the vehicle, joint means for connecting said strut structure to said end of the frame in such a manner that the axle together with the strut structure is capable of swinging about said joint means, springing means for springing the axle relative to the frame, which are incapable of resisting lateral forces acting between the axle and the frame, and means for supporting the axle against lateral swinging about said joint means.

50. In a vehicle, the combination according to claim 49 in which the springing means comprise unguided helical springs.

51. In a vehicle, the combination according to claim 49 in combination with a transverse frame member and a guiding member for the supporting of the axle against lateral motion positioned substantially in the central longitudinal vertical plane of the vehicle, means positioned on said axle on both sides of said guiding member extending over said transverse frame member, said springing means being positioned in a substantially vertical direction between said transverse frame member and the extensions on said axle.

52. In a vehicle, the combination according to claim 49, in combination with a drive and articulated shafts for driving the wheels from said drive, positioned on the frame between the wheels.

53. In a vehicle, the combination according to claim 49, wherein the frame is positioned beneath the axle and the means for supporting of the axle against lateral movement are positioned above the frame, and the spring means are positioned in such a manner that their upper ends abut against said axle and their lower ends against said frame.

54. In a vehicle, the combination according to claim 49, wherein the frame is positioned beneath the axle, and in which the means for supporting the axle against lateral motion are positioned above the frame, and the springing means are formed as unguided spiral springs acting under pressure, whose upper ends abut against said axle from below and whose lower ends abut against said frame from above.

55. In a vehicle, a frame, a pair of wheels, one on each side of said frame, an axle transverse to and crossing the frame upon which the said wheels are mounted, a strut structure connected to said axle and extending towards the end of the frame beyond the axis of said pair of wheels, joint means for connecting said strut structure to said end of the frame in such a manner that the axle together with the strut structure is capable of swinging about said joint means, springing means for springing the axle relative to the frame, which are incapable of resisting lateral forces acting between the axle and the frame, and positioned in such a manner that their upper ends abut against said axle and their lower ends against said frame, and means for supporting said axle against lateral swinging about said joint means, said supporting means being positioned above said frame.

56. The combination according to claim 55 in which said springing means are formed as unguided spiral springs acting under pressure, whose upper ends abut against said axle from below and whose lower ends abut against said frame from above.

57. In a motor vehicle chassis, a frame, a stiff axle, a pair of wheels on this axle, an axle drive mounted on the frame independently of the axle, drive shafts leading from the axle drive to the wheels, and a strut independent of the axle drive rigidly attached at one end to the axle and pivoted at its other end to the frame, said strut being positioned substantially in the central longitudinal vertical plane of the vehicle.

58. In a motor vehicle chassis, the combination according to claim 57 wherein the axle is positioned between the axle drive and the end of the vehicle, and said strut extends from the axle toward the end of the frame and is there pivotally connected.

59. In a motor vehicle chassis, a frame, a stiff axle, a pair of wheels on said axle, an axle drive mounted on the frame independent of the axle, drive shafts leading from the axle drive to the wheels, an engine shaft leading from the motor to the axle drive, and a strut rigidly connected at one end to the axle and at the other end pivoted to the frame and positioned substantially in the central longitudinal vertical plane of the vehicle, said strut extending from the axle drive on the side opposite the engine shaft.

60. In a motor vehicle chassis, the combination according to claim 59 wherein said drive wheels are the rear wheels of the engine, the engine shaft is positioned in front of the axle drive, and the strut rod extends from the axle toward the rear end of the frame.

61. In a motor vehicle chassis, the combination according to claim 57, in combination with a guiding track on the axle drive extending in a substantially vertical direction, and guiding wheels on the axle for the guiding of the same along said guiding track.

62. In a motor vehicle chassis, the combination according to claim 57, in combination with a guiding track on the axle drive, which extends in a substantially vertical direction, guiding means on the axle for the guiding of the same along said guiding track, and elastic means for the support of said drive on said frame.

63. In a vehicle, in combination, a frame having an end portion, a rigid axle having wheels mounted thereon and positioned above said frame, strut structure pivotally connecting said axle to said end portion of the frame, means for supporting the axle against lateral swinging relative to the frame, and spring means intermediate to, said frame and said axle.

64. In a motor vehicle chassis, a frame, a pair of wheels, a stiff axle connecting said wheels, which extends over the frame, a strut connected to the axle, pivotal means connecting said strut to said frame, wherein said pivotal means is positioned at an end portion of the frame longitudinally disposed from said axle, whereby the lines connecting the pivotal means and the wheel centers form a triangle with the axle which can swing relative to the frame about said pivotal means, and spring means intermediate said axle and said frame for opposing the swinging movement of said axle.

65. In a motor vehicle chassis, the combination according to claim 64, in combination with an axle drive mounted on the frame, and axle shafts for driving the wheels from said axle drive.

66. In the chassis of a vehicle, the combination of a rigid axle, a frame including a pair of longitudinally extending transversely displaced beams positioned below said axle, wheels on said axle outside of said beams, a single strut attached to said axle, and a joint pivotally connecting said strut to said frame, said strut lying intermediate said beams.

67. In the chassis of a vehicle, the combination comprising a frame including two longitudinal beams converging toward one end, a rigid axle, a pair of wheels mounted on said axle, a strut attached to said axle, and universal joint connecting said strut to the frame at the point of juncture of said converging beams.

68. The combination according to claim 18, in combination with a guide on said driving gear, and guiding means on said axle cooperating with said guide.

69. In a motor vehicle chassis, a frame, an axle, a pair of wheels on said axle, an axle drive mounted on the frame independently of the axle, drive shafts leading from the axle drive to the wheels, an engine shaft leading from the motor to the axle drive, and a strut structure connected at one end to the axle and at the other end pivoted to the frame, said strut structure extending from the axle drive on the side opposite the engine shaft.

MAX WAGNER.